(No Model.)
J. L. HOWE.
APPARATUS FOR UNLOADING HAY.
No. 302,254. Patented July 22, 1884.
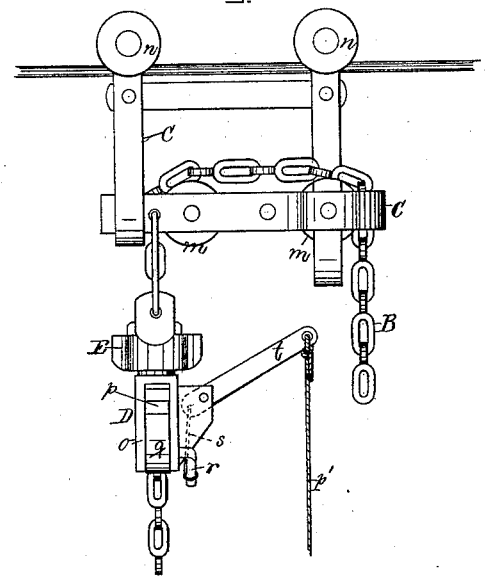
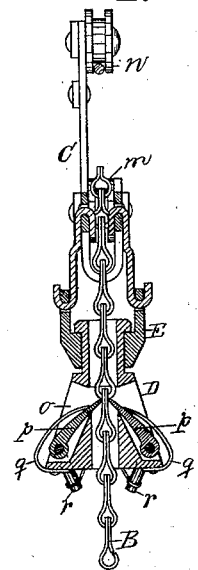
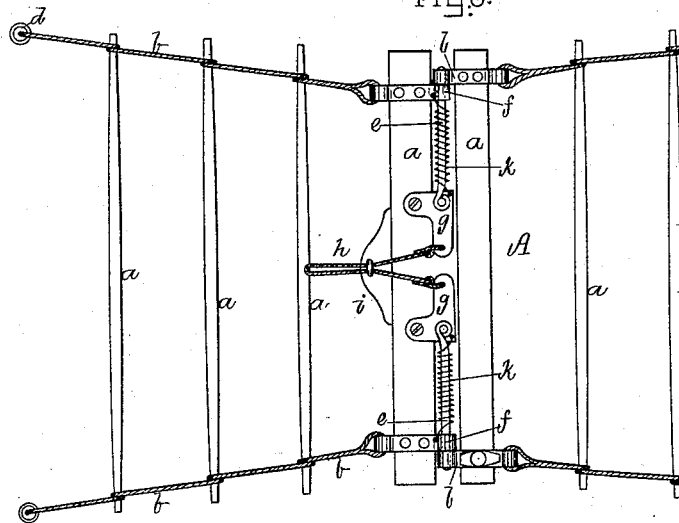
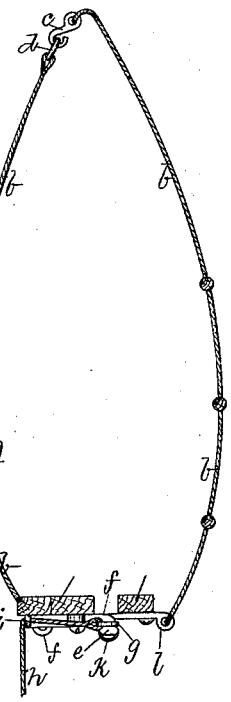
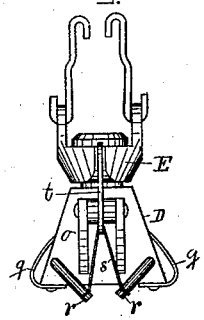
Witnesses.
S. N. Piper
E. P. Pratt.
Inventor
John Lewis Howe,
by R. H. Cady atty.

UNITED STATES PATENT OFFICE.

JOHN LEWIS HOWE, OF GREENE, MAINE.

APPARATUS FOR UNLOADING HAY.

SPECIFICATION forming part of Letters Patent No. 302,254, dated July 22, 1884.

Application filed June 9, 1884. (No model.)

*To all whom it may concern:*

Be it known that I, JOHN LEWIS HOWE, of Greene, in the county of Androscoggin, of the State of Maine, have invented a new and useful Improvement in Apparatus or Mechanism for Unloading Hay; and I do hereby declare the same to be described in the following specification and represented in the accompanying drawings, of which—

Figure 1 is a side elevation, and Fig. 2 a transverse section, of the movable carriage and its grapple, to be hereinafter described as making part of my invention, the nature of which is defined in the claims hereinafter presented. Fig. 3 is an under side view, and Fig. 4 a longitudinal section, of the hay-carrier to be described. Fig. 5 is a rear elevation of the said grapple.

This hay-carrier (shown at A) is in two separate sections, each of which is composed not only of a series of bars, $a$, arranged parallel to each other at suitable distances apart, but of two lines or ropes, $b$, connecting such bars at their ends, the lines of each being extended outwardly beyond it, and one pair being provided with hooks $c$, and the other with loops or eyes $d$, all as represented. The two inmost bars $a$ of the two sections are wider than the others, and have to one of them two bolts, $e$, supported by guides $f$, and pivoted to two bell-crank levers, $g$, that are fulcrumed to the bar, a rope, $h$, being attached at its ends to the longer arms of such levers, and extended through a guide-staple, $i$, inserted in the bar. Each bolt is furnished with a spring, $k$, for impelling it forward into a catch, $l$, projecting from the outer bar $a$, all being substantially as represented.

In using the said hay-carrier, it is to be placed within a hay-cart crosswise thereof, after which the hay is to be loaded upon the carrier, which is next to be drawn together about the hay, and the hooks $c$ are to be inserted in the eyes $d$. In this way the hay in the cart will be enveloped by the carrier. After the cart may have been driven from the field to the barn or stable wherein it may be desirable to unload the mass of hay, the chain of the hoisting apparatus (to be described) is to be suitably hooked or connected with the carrier. This chain is represented at B in Figs. 1 and 2 as passing over two grooved rollers or sheaves, $m$, arranged, as shown, in a carriage, C, provided with two sustaining-wheels, $n$, to rest and run upon a rail properly arranged in the upper part of the barn or stable. From one of these wheels the chain goes down through the grapple D, suspended to the carriage by a swivel, E, such as will admit of the grapple being revolved horizontally. The said grapple D consists of a frame or case, $o$, pivoted to the swivel, and provided with two pawls, $p$, arranged within it in manner as shown, each being pivoted at its lower part to the case, which is provided with springs $q$, to force the pawls at their upper parts inward against the chain. From the pivots of the two pawls two arms, $r$, project downward and inward toward each other, as shown in Fig. 5, such arms at their ends being connected by a bow, $s$, to the shorter arm of a lever, $t$, arranged as represented, and fulcrumed to the case $o$. This lever has attached to and depending from its longer arm a rope, $p'$. By pulling the said rope downward, the two pawls will be moved apart or thrown out of engagement with the chain, in order to admit of it being drawn downward through the grapple. The pawls when in engagement with the chain grasp it between any two of its next adjacent links, and hold it from being so pulled down when it may have drawn the carrier upward out of the cart. The swivel is to allow of the carrier being turned around horizontally, as occasion may require, in the passage of the hay from the cart to the mow.

After the carrier, with the hay, may have been lifted from the cart to a proper elevation by manual or other suitable power applied to the chain, the carriage is to be moved along on the rail, so as to transfer the carrier to a position for dumping the hay. This having been done, the rope $h$ is to be pulled, so as to cause the bolts of the carrier to be retracted or drawn out of the catches. The two sections of the carrier will then immediately separate, and the hay will drop from between them.

The cart may be supplied with as many of the carriers as can be employed to advantage therein.

I do not claim a hay-unloading mechanism constructed as represented in the United States Patent No. 280,159, in which the hay-carrier is shown as composed of ropes having at the outer ends fastening devices adapted to engage with hooks, and at the other ends locking devices and a tripping-rope thereto.

I claim—

1. The improved hay-carrier, substantially as described, having each of its two sections composed of a series of parallel bars arranged at suitable distances apart, and ropes connecting them at their ends, and the said sections provided with catches to one, and bolts, springs, bell-crank levers, and their actuating rope to the other, arranged to operate substantially as set forth.

2. The combination of the grapple and its swivel with the chain and its supporting-carriage, all being constructed and to operate substantially as represented.

3. The grapple, substantially as described, consisting of the swivel, and the pawl-case and the two pawls, their springs, arms, and actuating bow and lever, arranged and adapted essentially as specified.

JOHN LEWIS HOWE.

Witnesses:
ROSCOE K. BENNER,
GEORGE C. WING.